(12) United States Patent
Kallenberger et al.

(10) Patent No.: US 6,241,394 B1
(45) Date of Patent: Jun. 5, 2001

(54) LUBRICATING GROOVE PATTERN FOR A JOURNAL BEARING

(75) Inventors: Harvey J. Kallenberger, Wind Lake; Mark R. Zawlocki, Menomonee Falls, both of WI (US)

(73) Assignee: Hurnischfeger Technologies, Inc., Wilmington, DE (US)

( * ) Notice: Subject to any disclaimer, the term of this patent is extended or adjusted under 35 U.S.C. 154(b) by 0 days.

(21) Appl. No.: 09/494,007

(22) Filed: Jan. 28, 2000

(51) Int. Cl.$^7$ .................................................. F16C 33/10
(52) U.S. Cl. ............................................ 384/322; 384/291
(58) Field of Search .................................. 384/286, 289, 384/291, 377, 378, 398, 322, 372, 373, 385, 392, 416

(56) References Cited

U.S. PATENT DOCUMENTS

| | | | |
|---|---|---|---|
| 1,940,301 | * 12/1933 | Grobel et al. | 384/291 |
| 2,901,297 | * 8/1959 | Sternlicht | 384/291 |
| 3,881,788 | * 5/1975 | Kotauczek | 384/286 X |
| 4,105,267 | * 8/1978 | Mori | 384/291 |
| 5,245,882 | * 9/1993 | Kallenberger et al. | 74/405 |
| 5,320,431 | * 6/1994 | Kallenberger | 384/322 |
| 5,600,905 | * 2/1997 | Kallenberger et al. | 37/394 |

* cited by examiner

Primary Examiner—Thomas R. Hannon
(74) Attorney, Agent, or Firm—David R. Price

(57) ABSTRACT

A journal bearing including a generally cylindrical outer surface, and a generally cylindrical inner surface including an inner edge, an outer edge, a midline defined as a circumferential line midway between the inner edge and the outer edge, a least-loaded region and a highest-loaded region, and a first groove pattern symmetric about the midline, the pattern extending from the least-loaded region to the highest-loaded region, the pattern including a lubricant entry point on the midline in the least-loaded region, a lubricant reservoir on the midline on the opposite side of the highest-loaded region from the lubricant entry point, and substantially more grooving in the least-loaded region than in the highest-loaded region.

17 Claims, 3 Drawing Sheets

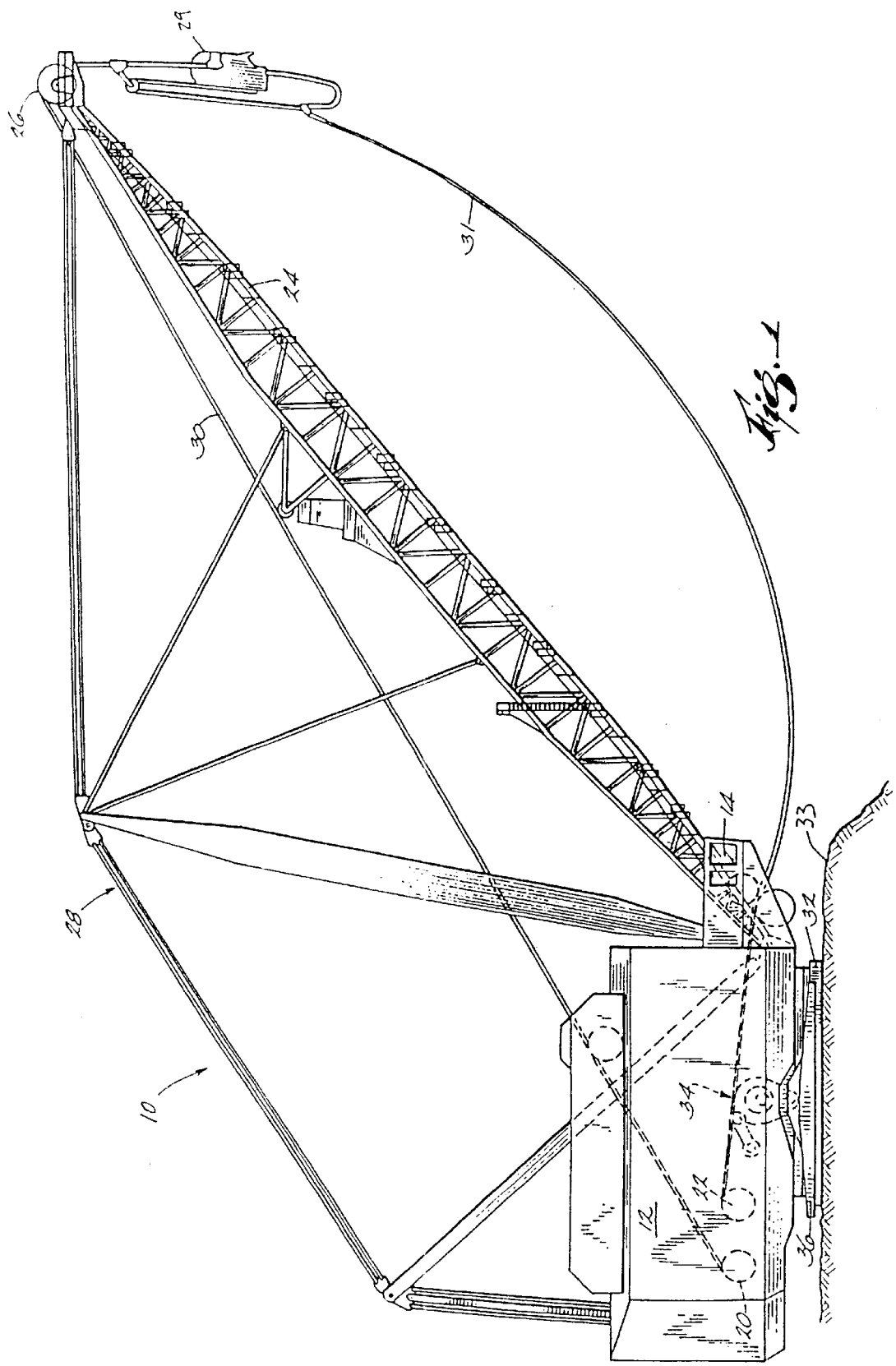

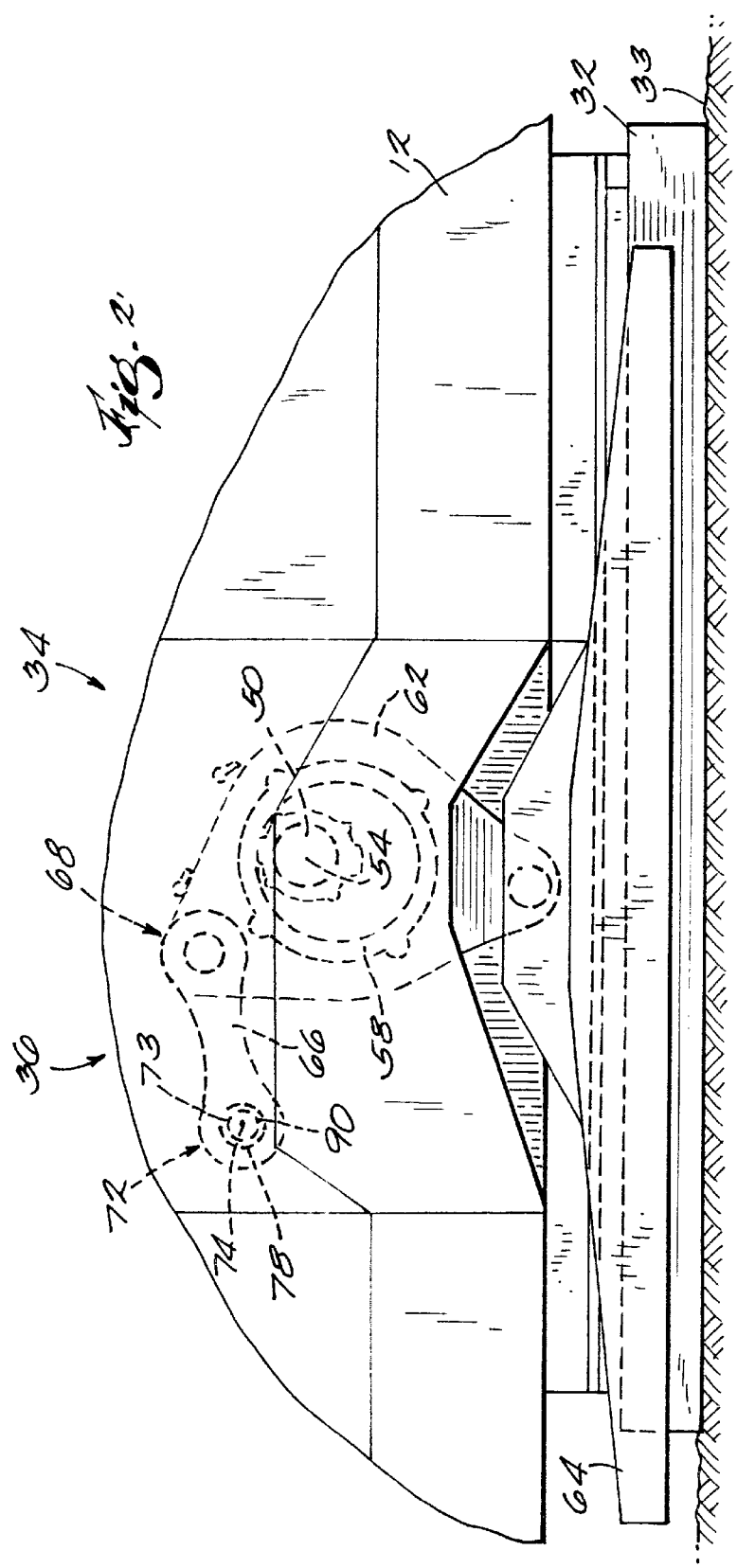

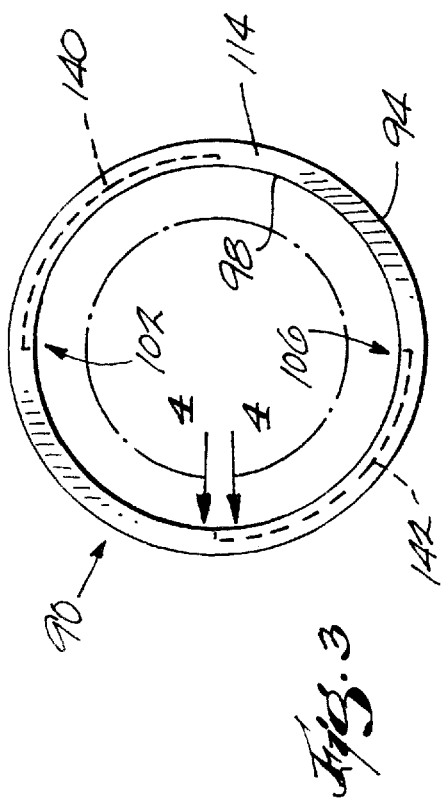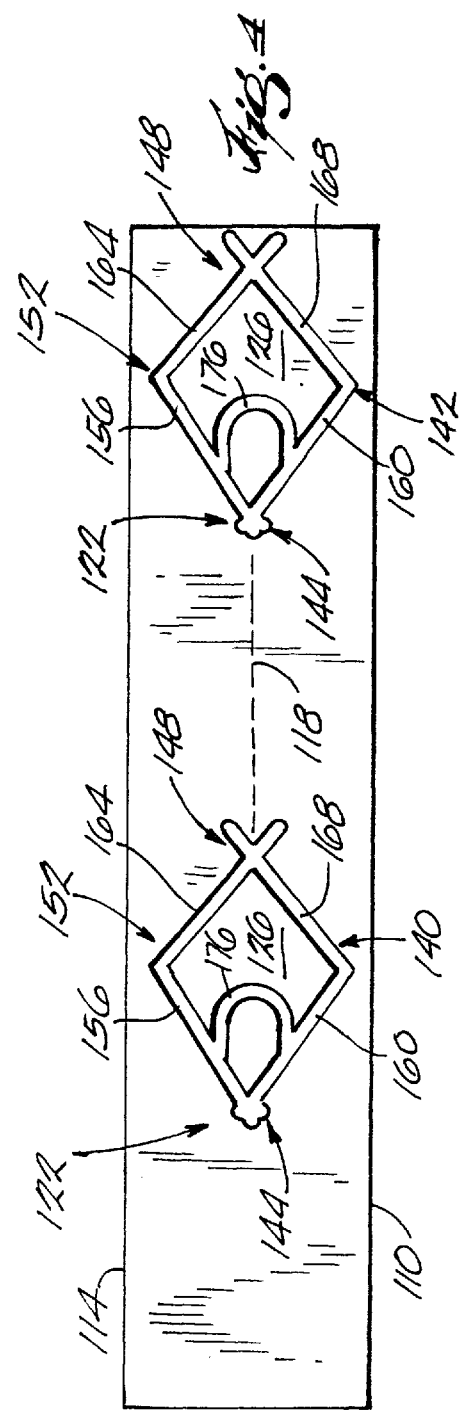

LUBRICATING GROOVE PATTERN FOR A JOURNAL BEARING

FIELD OF THE INVENTION

The invention relates to a walk mechanism for a dragline. The invention also relates to lubrication of journal bearings.

BACKGROUND OF THE INVENTION

A walking dragline typically includes a main housing and a boom that extends upwardly and outwardly from the main housing and has thereon a sheave for supporting a hoist rope. The hoist rope extends from a bucket hoist mechanism and over the sheave to a bucket for causing vertical movement of the bucket. A drag rope extends between a bucket drag mechanism and the bucket for causing horizontal movement of the bucket. The main housing is supported by a tub that sits on the ground when the dragline is engaged in digging operations. Two matching walk mechanisms are mounted on opposite sides of the main housing and are operable for moving the main housing over the ground between digging operations.

U.S. Pat. No. 5,245,882 discloses a walk mechanism of typical construction. A walk mechanism ordinarily includes a shoe for engaging the ground during walking movement. The shoe is fixed to a walk leg housing that is mounted on an eccentric. The eccentric is fixed to a main walk shaft and rotates at about one revolution per minute. The eccentric is connected by a knee link to the main housing through a journal bearing and a pin fixed to the main housing, such that rotation of the eccentric causes the walk leg housing to pivot, thereby causing walking movement of the shoe. The motion of the knee link relative to the pin is oscillatory and pivotal. The journal bearing facilitates the pivoting movement between the knee link and the pin.

U.S. Pat. No. 5,320,431 discloses a walk mechanism journal bearing design typical of prior art constructions. Various grease groove arrangements have been tried to provide effective lubrication within the bearing. Those shown include opposed sine waves, axially-directed grooves, and angled grooves cut into the interior cylindrical surface of the bearing.

For proper function and life, a suitable film of lubricant should always be present between a bearing surface and the mating contact surface in the area of relative motion. To accomplish this, a predetermined amount of lubricant is forced into a groove pattern that carries the lubricant to the desired areas. If the lubrication system fails or does not provide adequate mounts, all surfaces in contact may not have the proper film thickness during operation. The end result could be accelerated wear of both the bearing and the mating surface.

One problem with conventional dragline walk mechanisms is wear on the walk mechanism components, particularly the journal bearing, that is compounded by the relative inaccessibility of the journal bearing. The wear is due in large part to inadequate lubrication in the bearing, and to insufficient bearing surfaces in the highest-loaded regions of the bearing.

SUMMARY OF THE INVENTION

The invention provides a journal bearing with improved features that give it a longer duration between maintenance outages.

In particular, the invention provides a journal bearing comprising a generally cylindrical outer surface and a generally cylindrical inner surface. The inner surface includes an inner edge, an outer edge, and a midline defined as a circumferential line midway between the inner edge and the outer edge. The inner surface also includes a least-loaded region and a highest-loaded region, and a first groove pattern symmetric about the midline, the pattern extending from the least-loaded region to the highest-loaded region. The pattern includes a lubricant entry point on the midline in the least-loaded region, a lubricant reservoir on the midline on the opposite side of the highest-loaded region from the lubricant entry point, and substantially more grooving in the least-loaded region than in the highest-loaded region.

In addition, the invention provides a journal bearing comprising a generally cylindrical outer surface and a generally cylindrical inner surface. The inner surface includes an inner edge, an outer edge, and a midline defined as a circumferential line midway between the inner edge and the outer edge. The inner surface also includes a first groove pattern, the groove pattern being symmetric about the midline, the pattern including a lubricant entry point on the midline, a lubricant reservoir on the midline, a generally diamond-shaped outer groove having first, second, third, and fourth groove segments, each groove segment being oblique to the midline, the first and second groove segments meeting at the lubricant entry point, the third and fourth groove segments intersecting at the lubricant reservoir, the first and second groove segments connecting with the third and fourth groove segments, respectively, and a substantially semicircular inner groove extending between the first and second groove segments and having a concave side facing the lubricant entry point.

The invention provides a groove pattern in which lubricant is substantially always available in the grooves regardless of the amount injected.

The invention also provides a groove pattern such that, even with small oscillatory rotational or pivotal movement between the bearing and the mating surface, lubricant is spread over a high percentage of the surface.

The invention also features a groove pattern design including a lubricant entry point and a lubricant reservoir that has the advantage of limiting wear in the bearing due to the bearing's ability to store, collect, and distribute an adequate amount of lubricant within the bearing.

The invention also features a groove pattern design that limits the amount of grooves in the regions of highest loading in the bearing to ensure that sufficient bearing surface is available to carry the load.

Other features and advantages of the invention will become apparent to those skilled in the art upon review of the following detailed description, claims, and drawings.

BRIEF DESCRIPTION OF THE DRAWINGS

FIG. 1 is an elevation view of a dragline embodying the invention.

FIG. 2 is a close-up view of the dragline walk mechanism shown in FIG. 1, including a journal bearing embodying the invention.

FIG. 3 is an end elevation view of the journal bearing of FIG. 2.

FIG. 4 is a view of the "unrolled" inner surface of the journal bearing of FIG. 2, taken along line 4—4 of FIG. 3.

Before one embodiment of the invention is explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein is for the purpose of description and should not be regarded as limiting. The use of "including" and "comprising" and variations thereof herein is meant to encompass the items listed thereafter and equivalents thereof as well as additional items.

DETAILED DESCRIPTION OF THE PREFERRED EMBODIMENT

A dragline 10 embodying the invention is illustrated in FIGS. 1–5. Except as described below, the dragline 10 is substantially identical to the dragline described in U.S. Pat. No. 5,600,905, which is assigned to the assignee hereof, and which is incorporated herein by reference.

As illustrated in FIG. 1, the dragline 10 includes a main housing 12 including an operator's cab 14. The dragline 10 also includes a bucket hoist mechanism 20 and a bucket drag mechanism 22, both of which are mounted on the main housing 12. A boom 24 extends upwardly and outwardly from the main housing 12. The boom 24 is supported relative to the main housing 12 by conventional supporting structure 28. The upper end of the boom 24 has thereon a sheave 26. The dragline 10 also includes a bucket 29, a hoist rope 30 extending between the bucket hoist mechanism 20 and the bucket 29 and over the sheave 26 for causing vertical movement of the bucket 29, and a drag rope 31 extending between the bucket drag mechanism 22 and the bucket 29 for causing horizontal movement of the bucket 29. The dragline 10 further includes a tub 32 that sits on the ground 33 and thus supports the main housing 12 during digging operations. The dragline 10 also includes a walk mechanism 34, further described below, which moves the dragline 10 over the ground 33 between digging operations.

In the illustrated embodiment (FIGS. 1 and 2), the walk mechanism 34 includes a walking mechanism 36. A second walking mechanism (not shown) is identical to the walking mechanism 36 and is located on the opposite side of the main housing 12 from the walking mechanism 36. Turning to FIG. 2, the walking mechanism 36 includes a drive mechanism (not shown) drivingly connected to a main walk shaft 50. The main walk shaft 50 is rotatably supported on the main housing 12 for rotation about a generally horizontal axis 54. A driven eccentric 58 is fixed to the main walk shaft 50 for common rotation therewith about the axis 54. The walking mechanism 36 includes a walk leg housing 62 that is mounted on the driven eccentric 58 such that rotation of the driven eccentric 58 causes walking movement of the walk leg housing 62. A walk shoe 64 is fixed to the walk leg housing 62 for engaging the ground 33 during walking movement of the walk leg housing 62.

The walking mechanism 36 also includes a knee link 66. One end 68 of the knee link 66 is pivotably connected to the walk leg housing 62. The other end 72 of the knee link 66 is pivotably connected to a pin 73 that is affixed to the main housing 12 and that has a generally horizontal axis 74. The motion of the knee link 66 relative to the pin 73 is oscillatory and pivotal. The end 72 of the knee link 66 has therein a bore 78 housing a journal bearing 90 that pivotally connects the knee link 66 to the pin 73. The journal bearing 90 is mounted on the pin 73 and is centered on the horizontal axis 74. As best shown in FIG. 3, the journal bearing 90 includes a generally cylindrical outer surface 94, and a generally cylindrical inner surface 98. The inner surface 98 engages the pin 73.

The journal bearing 90 is held against rotation (i.e. does not rotate relative to the pin 73), as is known in the art, and the inner surface 98 thus includes an apex 102, which is the topmost point on the inner surface 98, and a base 106, which is the bottommost point on the inner surface 98. The inner surface 98 also includes an inner edge 110, which is the edge facing the main housing 12, and an outer edge 114, which is the edge facing away from the main housing 12. As best shown in FIG. 4, the inner surface 98 also includes a midline 118 defined as a circumferential line midway between the inner edge 110 and the outer edge 114. Due to the action of the knee link 66, which exerts forces on the bearing 90 and thus on the pin 73, the inner surface further includes least-loaded regions 122 and highest-loaded regions 126 alternately spaced around the inner surface 98. One least-loaded region 122 is generally at the apex 102, and another least-loaded region 122 is generally at the base 106. The apex 102 and the base 106 of the inner surface 98 of the journal bearing 90 carry lower loads than the regions between the apex 102 and the base 106.

The inner surface 98 includes lubricant groove patterns 140 and 142. Except for its location, the groove pattern 142 is substantially identical to the groove pattern 140, and common elements have been given the same reference numerals. The groove pattern 142 is located approximately 180 degrees around the inner surface 98 from the groove pattern 140, as further explained below. Only the groove pattern 140 will be explained in detail. While region 122 is loaded less than the higher loaded region 126, it is understood that the least loaded areas are those between the groove patterns 140 and 142.

The groove pattern 140 is generally symmetric about the midline 118. The groove pattern 140 is machined into the inner surface 98 and is designed to hold lubricant for the interface between the journal bearing 90 and the pin 73. The lubricant is preferably grease but may be any other suitable lubricant. The groove pattern 140 extends from a least-loaded region 122 to a highest-loaded region 126 and extends over approximately ninety degrees of the inner surface 98.

The groove pattern 140 includes a lubricant entry point 144 on the midline 118 and at the apex 102 (and therefore in a least-loaded region 122). The lubricant entry point 144 is a reservoir to which lubricant is added through, for example, radial feed holes (not shown) as is known in the art. The groove pattern 140 also includes a lubricant reservoir 148 on the midline 118 on the opposite side of a highest-loaded region 126 from the lubricant entry point 144. The lubricant reservoir 148 is a secondary lubricant reservoir designed to collect excess lubricant feed by gravity from lubricant entry point 144 and to distribute lubricant to the end of the groove pattern 140.

The groove pattern 140 includes a generally diamond-shaped outer groove 152 having first, second, third, and fourth groove segments 156, 160, 164, 168, respectively. Each groove segment 156, 160, 164, 168 is oblique to the midline 118. The groove segments 156, 160 converge to meet at the lubricant entry point 144. The groove segments 164, 168 extend from the groove segments 156, 160, respectively, and converge to intersect at the lubricant reservoir 148. The groove segments 164, 168 extend beyond and diverge on the other side of the lubricant reservoir 148. The groove pattern 140 also includes a substantially semi-circular inner groove 176 extending between the groove segments 156, 160. The inner groove 176 has a concave side facing the lubricant entry point 144. In other words, the groove 176 bows away from the entry point 144. The groove 176 is located in the least-loaded region 122 along with the entry point 144, and the highest-loaded region 126 is located between the groove 176 and the reservoir 148. Lubricant travels through the groove pattern 140 under the influences of gravity, pin rotation and operating pressures such that lubrication is provided throughout the inner surface 98 of the journal bearing 90.

The groove pattern 140 includes substantially more grooving in the least-loaded region 122 than in the highest-loaded region 126 to allow the higher loading to be carried by more surface area of the inner surface 98. More grooving in the highest-loaded region 126 would tend to adversely concentrate loads in the remaining surface area of inner surface 98.

As mentioned above, the groove pattern 142 is located about 180 degrees around the inner surface 98 from the groove pattern 140. More particularly, the lubricant entry point 144 of the groove pattern 142 is at the base 106 of the inner surface 98.

Various features of the invention are set forth in the following claims.

What is claimed is:

1. A journal bearing comprising:
   a generally cylindrical outer surface, and
   a generally cylindrical inner surface including
      an inner edge,
      an outer edge,
      a midline defined as a circumferential line midway between the inner edge and the outer edge,
      a least-loaded region and a highest-loaded region, and
      a first groove pattern symmetric about the midline, the pattern extending from the least-loaded region to the highest-loaded region, the pattern including
         a lubricant entry point on the midline in the least-loaded region,
         a lubricant reservoir on the midline on the opposite side of the highest-loaded region from the lubricant entry point, and
         substantially more grooving in the least-loaded region than in the highest-loaded region.

2. The journal bearing of claim 1, wherein the groove pattern includes a generally diamond-shaped outer groove having first, second, third, and fourth groove segments, each groove segment being oblique to the midline, the first and second groove segments meeting at the lubricant entry point, the third and fourth groove segments intersecting at the lubricant reservoir, and the first and second groove segments connecting with the third and fourth groove segments, respectively.

3. The journal bearing of claim 2, wherein the groove pattern includes a substantially semicircular inner groove extending between the first and second groove segments and having a concave side facing the lubricant entry point.

4. The journal bearing of claim 2, the third and fourth groove segments extending beyond the lubricant reservoir.

5. The journal bearing of claim 1 wherein the journal bearing is centered on a generally horizontal axis and is held against rotation about the axis, wherein the inner surface includes an apex in the least-loaded region, and wherein the lubricant entry point is at the apex.

6. The journal bearing of claim 1 wherein the groove pattern extends over approximately ninety degrees of the inner surface.

7. The journal bearing of claim 1, wherein the inner surface has an additional least-loaded region and an additional highest-loaded region such that the least-loaded regions and the highest-loaded regions are alternately spaced around the inner surface, and further comprising a second groove pattern that is substantially identical to the first groove pattern and that has substantially more grooving in a least-loaded region than in a highest-loaded region.

8. The journal bearing of claim 7 wherein the second groove pattern is arranged approximately 180 degrees around the inner surface from the first groove pattern.

9. A journal bearing comprising:
   a generally cylindrical outer surface, and
   a generally cylindrical inner surface including
      an inner edge,
      an outer edge,
      a midline defined as a circumferential line midway between the inner edge and the outer edge, and
      a first groove pattern, the groove pattern being symmetric about the midline, the pattern including
         a lubricant entry point on the midline,
         a lubricant reservoir on the midline,
         a generally diamond-shaped outer groove having first, second, third, and fourth groove segments, each groove segment being oblique to the midline, the first and second groove segments meeting at the lubricant entry point, the third and fourth groove segments intersecting at the lubricant reservoir, the first and second groove segments connecting with the third and fourth groove segments, respectively, and
         a substantially semicircular inner groove extending between the first and second groove segments and having a concave side facing the lubricant entry point.

10. The journal bearing of claim 9 wherein the inner surface includes a least-loaded region and a highest-loaded region, and wherein the first groove pattern extends from the least-loaded region to the highest-loaded region.

11. The journal bearing of claim 10 wherein the first groove pattern extends over approximately ninety degrees of the inner surface.

12. The journal bearing of claim 10, the lubricant entry point being in the least-loaded region.

13. The journal bearing of claim 12 wherein the journal bearing is centered on a generally horizontal axis and is held against rotation about the axis, wherein the inner surface has an apex, and wherein the lubricant entry point is at the apex.

14. The journal bearing of claim 10, the lubricant reservoir being on the opposite side of the highest-loaded region from the lubricant entry point.

15. The journal bearing of claim 9 wherein the inner surface includes a second groove pattern substantially identical to the first groove pattern and arranged approximately 180 degrees around the inner surface from the first groove pattern.

16. The journal bearing of claim 9, the third and fourth groove segments extending beyond the lubricant reservoir.

17. A dragline comprising:
   a main housing;
   a bucket hoist mechanism mounted on the main housing;
   a bucket drag mechanism mounted on the main housing;
   a boom extending from the main housing;
   a sheave mounted on the boom;
   a bucket;
   a hoist rope extending between the bucket and the bucket hoist mechanism and over the sheave for causing vertical movement of the bucket;
   a drag rope extending between the bucket and the bucket drag mechanism for causing horizontal movement of the bucket; and a walk mechanism for moving the main housing over the ground, the walk mechanism including
  a pin that is fixed to the main housing and that extends along a generally horizontal axis,
  a walk leg housing,
  a knee link pivotably attached to the walk leg housing for pivotable movement in relation thereto, the knee link including a bore, and
  a journal bearing that is mounted on the pin and that is housed in the bore to provide a pivotable connection between the knee link and the pin, the journal bearing being centered on the generally horizontal axis, being held against rotation relative to the pin, and including
    a generally cylindrical outer surface, and
    a generally cylindrical inner surface including
      an apex,
      an inner edge,
      an outer edge,
      a midline defined as a circumferential line midway between the inner edge and the outer edge,
      least-loaded regions and highest-loaded regions alternately spaced around the inner surface, one least-loaded region being generally at the apex,
      a first groove pattern, the groove pattern being symmetric about the midline, the pattern extending from a least-loaded region to a highest-loaded region and extending over approximately ninety degrees of the inner surface, the pattern including
        a lubricant entry point on the midline and at the apex in the least-loaded region,
        a lubricant reservoir on the midline on the opposite side of a highest-loaded region from the lubricant entry point,
        substantially more grooving in the least-loaded region than in the highest-loaded region,
        a generally diamond-shaped outer groove having first, second, third, and fourth groove segments, each groove segment being oblique to the midline, the first and second groove segments meeting at the lubricant entry point, the third and fourth groove segments intersecting at the lubricant reservoir, the third and fourth groove segments extending beyond the lubricant reservoir, the first and second groove segments connecting with the third and fourth groove segments, respectively, and
        a substantially semicircular inner groove extending between the first and second groove segments and having a concave side facing the lubricant entry point, and
      a second groove pattern substantially identical to the first groove pattern and arranged approximately 180 degrees around the inner surface from the first groove pattern.

* * * * *